March 1, 1949.  J. W. DOUTHITT  2,463,162
TOOL HOLDER
Filed May 8, 1945
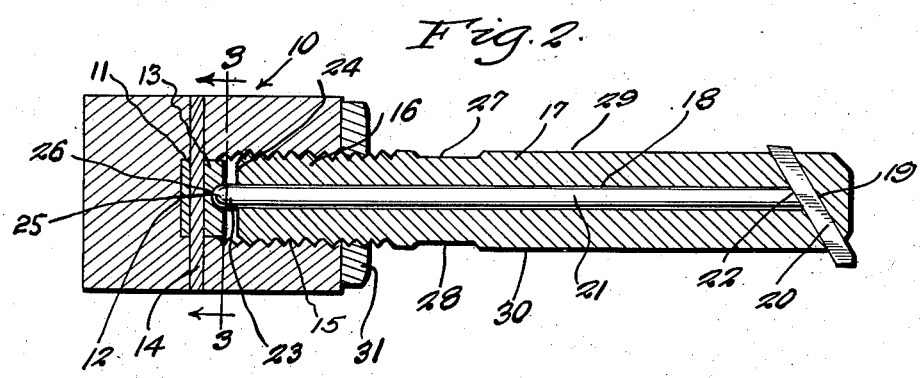
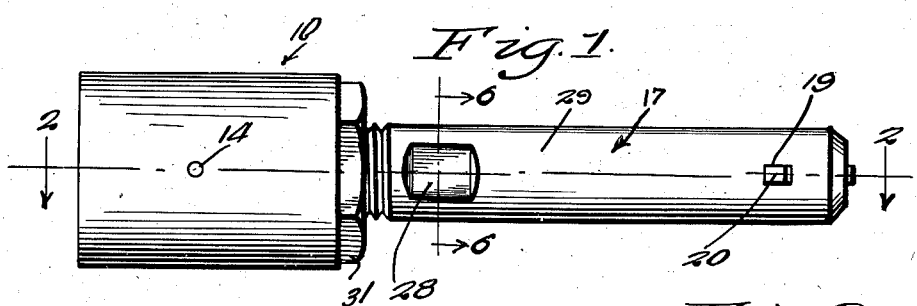
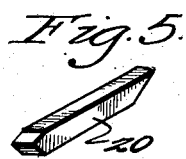
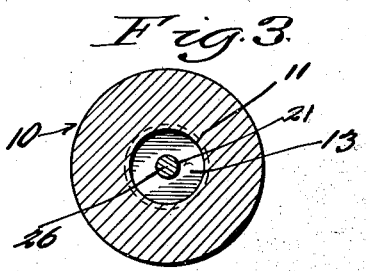
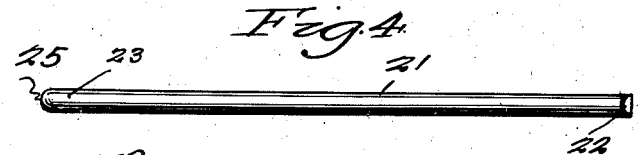
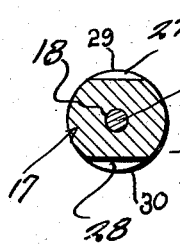
Inventor
Jack W. Douthitt
By Clarence A. O'Brien
and Harvey B. Jacobson
Attorneys Patented Mar. 1, 1949

2,463,162

UNITED STATES PATENT OFFICE 2,463,162

TOOLHOLDER

Jack W. Douthitt, Duncan, Okla.

Application May 8, 1945, Serial No. 592,664

1 Claim. (Cl. 29—96)

This invention relates to tool holders for a lathe tail-stick or the like and has for its object to provide a very simply constructed yet very effective tool holder and comprising few parts and having no projecting screws or other like holding devices to interfere with the work or the user.

Another object of the invention is to provide a tool holder consisting of a cylindrical body with no elements thereof projecting from the cylinder.

A still further object of the invention is to provide in a tool holder means completely enclosed within its body for securing a tool therein.

Another object of the invention is to provide a tool holder so constructed that slight turn thereof will instantly release a tool carried thereby.

Other features and advantages will become more readily apparent from the following description and the accompanying illustrative drawings in which:

Figure 1 is an elevational view of my improved tool holder,

Figure 2 is a sectional view taken on line 2—2 thereof,

Figure 3 is a sectional view taken on line 3—3 of Figure 2,

Figure 4 is a detail elevation of a tool securing device,

Figure 5 is a perspective view of a tool to be held in my holder, and

Figure 6 is a sectional view on line 6—6 of Figure 1.

In the specification and drawings the same reference numerals indicate the same parts and 10, indicates a tool holder body or support to be held in a turret or other like device. This body member is provided with a bore 11, against the inner wall 12, of which is held a hardened seat 13, held in place by a transverse pin 14. The outer portion 15, of said bore is threaded and into which the threaded end 16, of the tool holder 17, is adapted to be screwed.

The holder 17, is cylindrical throughout its length and provided with a longitudinal central bore 18, terminating outwardly at an inclined passage 19, in which a cutting tool 20, is adapted to seat. Loosely mounted within the bore 18, is an elongated rod 21, one end 22, of which is adapted to bear against the tool 20, and the other end 23, of which projects beyond the end 24, of member 17, and its rounded terminal 25, is adapted to seat in the recess 26, of member 13, whereupon by applying a wrench upon the flattened surfaces 27 and 28, on the opposite sides 29 and 30, of the member 17, said member 17, may be screwed tightly into said body 10, thus forcing outwardly the rod 21, and causing its end 22, to firmly secure the tool 20, in place. When sufficiently tightened, the lock nut 31, is tightened whereby no rapid rotation of the tool holder 17, will loosen it from its body 10. However, an almost instant adjustment of the tool 20, may be made and a replacement by another tool simply by loosening the nut 31, and giving the member 17, a slight anti-clockwise movement with a wrench whereupon the rod 21, will be sufficiently released to permit said adjustment or replacement.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A tool holder comprising a body member having an internally threaded central bore at one end and a closed opposing end, a shank detachably and adjustably associated with said body member and having an externally threaded end received in said bore in the body member, said shank having a centrally disposed longitudinally extending passage extending from the threaded end to a point spaced inwardly from the other end, a cross bore disposed in said shank adjacent the last mentioned end and communicated with said passage for adjustably receiving a cutting tool, means for locking said cutting tool in the cross bore, said means including a locking rod slidably disposed in the passage and engaged at one end against the cutting tool, a bearing block disposed in the central bore in the body member and provided with a centrally disposed concaved section adapted to receive the other end of the locking rod, a transverse locking pin disposed through said body member and bearing block and means for securing the several parts in locked position and means for accommodating an adjusting tool to adjust the pressure exerted by the locking rod on the cutting tool.

JACK W. DOUTHITT.

REFERENCES CITED

The following references are of record in the file of this patent:

UNITED STATES PATENTS

| Number | Name | Date |
| --- | --- | --- |
| 1,320,162 | Marsh et al. | Oct. 28, 1919 |
| 1,377,109 | Aulenback | May 3, 1921 |
| 1,813,567 | Delorme | July 7, 1931 |
| 2,278,631 | Young | Apr. 7, 1942 |
| 2,355,324 | Palmer | Aug. 8, 1944 |

FOREIGN PATENTS

| Number | Country | Date |
| --- | --- | --- |
| 378,740 | Germany | July 31, 1923 |